United States Patent
Urban et al.

(10) Patent No.: US 8,065,084 B2
(45) Date of Patent: Nov. 22, 2011

(54) METHOD FOR DETERMINING THE PLAUSIBILITY OF OBJECTS IN DRIVER ASSISTANCE SYSTEMS

(75) Inventors: Werner Urban, Vaihingen/Enz (DE); Ruediger-Walter Henn, Weil der Stadt (DE); Viktor Moser, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 742 days.

(21) Appl. No.: 11/884,172

(22) PCT Filed: Feb. 8, 2006

(86) PCT No.: PCT/EP2006/050754
§ 371 (c)(1),
(2), (4) Date: Sep. 10, 2008

(87) PCT Pub. No.: WO2006/087281
PCT Pub. Date: Aug. 24, 2006

(65) Prior Publication Data
US 2009/0055095 A1    Feb. 26, 2009

(30) Foreign Application Priority Data
Feb. 21, 2005  (DE) .......................... 10 2005 007 802

(51) Int. Cl.
*B60K 31/00*       (2006.01)
*G01S 13/93*       (2006.01)
*G06F 19/00*       (2006.01)

(52) U.S. Cl. ........... 701/301; 701/96; 701/205; 340/435
(58) Field of Classification Search .................. 701/301, 701/300, 209, 213, 302, 93, 96, 205; 340/903, 340/435, 436; 342/146, 70
See application file for complete search history.

(56) References Cited

U.S. PATENT DOCUMENTS

| 7,124,027 B1* | 10/2006 | Ernst et al. ................... 701/301 |
| 7,522,091 B2* | 4/2009 | Cong et al. .................... 342/70 |
| 7,565,006 B2* | 7/2009 | Stam et al. .................... 382/155 |
| 2002/0036584 A1* | 3/2002 | Jocoy et al. .................... 342/70 |

FOREIGN PATENT DOCUMENTS

| DE | 100 18 556 | 10/2001 |
| DE | 101 18 265 | 10/2002 |
| DE | 102 54 394 | 6/2004 |

* cited by examiner

*Primary Examiner* — Tan Q Nguyen
(74) *Attorney, Agent, or Firm* — Kenyon & Kenyon LLP

(57) ABSTRACT

A method for determining the plausibility of objects in driver assistance systems of motor vehicles includes the steps of statistically analyzing the lateral offsets (Y) of stationary objects to detect left and right roadway boundaries, analyzing the lateral offsets (Y_H) of moving objects to detect any adjacent lanes, calculating a probability value Q_R that the host vehicle is in the extreme right traffic lane of the roadway and a probability value Q_L that the host vehicle is in the extreme left traffic lane, and varying the width and/or lateral position of the travel route envelope as a function of the probability values Q_R and Q_L.

22 Claims, 5 Drawing Sheets

METHOD FOR DETERMINING THE PLAUSIBILITY OF OBJECTS IN DRIVER ASSISTANCE SYSTEMS

BACKGROUND OF THE INVENTION

1. Field of the Invention

The present invention relates to a method for determining the plausibility of objects in driver assistance systems of motor vehicles which have a locating system, e.g., a radar system, for locating objects in the surroundings of the vehicle and for measuring lateral offsets of these objects in the direction perpendicular to the direction of travel, in which method a travel route envelope is defined for the host vehicle, and the plausibility of moving objects is determined according to whether they are inside or outside of the travel route envelope.

2. Description of Related Art

In driver assistance systems which support the driver in guiding a motor vehicle, it is often necessary to determine the plausibility of located objects, particularly other preceding vehicles. By this is meant that it is necessary to decide whether or not these objects must potentially be taken into account in the execution of the assistance function in question. Examples for driver assistance systems in which this problem occurs are, for instance, adaptive vehicle speed controllers, also known as ACC systems (adaptive cruise control), in which the traveling speed of the host vehicle is adjusted in such a way that a located preceding vehicle is followed at a suitable distance, or warning and safety systems which are intended to warn the driver of an imminent collision and/or to initiate automatic measures for mitigating the effects of a collision.

To determine object plausibility in such systems, a travel route envelope of suitable width is defined which describes the anticipated course of the host vehicle, and objects that are within this travel route envelope are checked for plausibility in an ACC system in the sense that they are graded as potentially relevant obstacles to which the vehicle speed controller may have to react. Among the objects whose plausibility has thus been determined, one object, typically that having the smallest distance to the host vehicle, is then selected as the target object for the distance control.

In general, the width of the travel route envelope should correspond approximately to the width of the traffic lane being used by the host vehicle. However, the following conflict of aims occurs when exactly defining this width. On one hand, the width should be selected to be as great as possible, so that potential target objects can be detected early on, especially when the course of the roadway is not straight, and therefore the speed can be adjusted in plenty of time. On the other hand, if the travel route envelope is so wide that it extends to parts of adjacent lanes, there is the danger that so-called adjacent-lane disturbances will occur, that is, that the plausibility of objects which are in the adjacent lane and therefore are not actually relevant will be falsely determined, and these objects will be included in the evaluation, so that faulty reactions occur in the system.

To optimize the width of the travel route envelope, it has already been proposed to enlarge the travel route envelope beyond a certain basic width as soon as a target object has been detected, so that this target object can then be followed in a steadier manner. However, this has the disadvantage that the front vehicle being followed is retained as the target object unnecessarily long, even when this vehicle changes to an adjacent lane, and the adjacent-lane disturbances occurring have a longer and therefore substantially more intense effect.

Another approach is to differentiate between various types of roads, namely, freeways on one hand and country roads on the other hand, based on data provided by a navigation system or based on locating data supplied by the locating system. On freeways, which generally have several traffic lanes per travel direction, a narrower travel route envelope is then selected in order to avoid adjacent-lane disturbances, while on country roads, which generally have only one traffic lane in each direction, a wider travel route envelope is selected, thereby permitting earlier detection and steadier tracking of the target object. Here, however, there is the disadvantage that on freeways, the target object can only be detected relatively late, and thus the approach behavior of the host vehicle is impaired. On the other hand, on country roads, particularly on well-enlarged, very broad country roads, as well as in the case of crawler lanes, acceleration lanes or turn-off lanes occasionally present on country roads as well, there is a high susceptibility for adjacent-lane disturbances.

A BRIEF SUMMARY OF THE INVENTION

The present invention makes it possible—independently of or as a supplement to additional information as supplied, for instance, by a navigation system—to optimize the width and position of the travel route envelope as a function of the instantaneous situation.

For this purpose, the following steps are carried out in the method according to the present invention:
- statistical analysis of the lateral offsets of stationary objects to detect left and right roadway boundaries,
- analysis of the lateral offsets of moving objects to detect any adjacent lanes,
- calculating a probability value $Q\_R$ that the host vehicle is in the extreme right traffic lane of the roadway, and a probability value $Q\_L$ that the host vehicle is in the extreme left traffic lane, and
- varying the width and/or lateral position of the travel route envelope as a function of the probability values $Q\_R$ and $Q\_L$.

Radar systems, which are typically used as locating systems in driver assistance systems, permit not only a measurement of the distance and the relative speed of the located objects, but also a measurement of the azimuth angle of the object on the basis of a certain angular-resolution capability of the radar sensor. Base on this azimuth angle, in conjunction with the measured object distance, it is possible to measure the lateral offset of the object, thus the position in the direction perpendicular to the travel direction of the host vehicle. Moreover, a comparison of the measured relative speed to the known traveling speed of the host vehicle makes it possible to differentiate between stationary and moving objects. In the case of a locating system in which the relative speed cannot be measured directly, the relative speed is obtained by time derivation of the distance data. The objects detected as stationary objects will generally be objects at the edge of the roadway or near the edge of the roadway, e.g., guardrail posts and the like. Therefore, by statistical analysis of the lateral offsets of these objects, it is possible to estimate a probable value for the position of the left and right roadway edges in relation to the host vehicle. In this way, information is obtained not only about the width of the roadway, but also about whether the host vehicle is nearer to the right or nearer to the left edge of the roadway.

Correspondingly, an analysis of the lateral offsets of moving objects, particularly preceding and oncoming vehicles, permits a determination of the number of traffic lanes per travel direction, as well as detection of the position of the host vehicle in relation to these traffic lanes.

If these analysis results are combined with each other, it is possible to indicate at least a certain probability Q_R or Q_L that the host vehicle is in the extreme right or the extreme left traffic lane. In this context, it is possible that Q_R and Q_L will assume high values simultaneously, which means that it is a single-lane roadway.

Thus, these probability values implicitly contain information about the possible presence of adjacent lanes, and on this basis, it is possible to optimize the width of the travel route envelope depending on the situation, so that whenever no adjacent lanes are present, and therefore there is also no need to fear any adjacent-lane disturbances, it is possible to detect and determine the plausibility of objects early on, while if adjacent lanes are present, the travel route envelope is restricted so that adjacent-lane disturbances are avoided. Since this method is geared only to the actual and instantaneous circumstances and not to a specific type of road, the advantages of a wide travel route envelope, thus an improved approach behavior of the host vehicle, can be achieved even in the case of single-lane traffic routing at freeway construction sites, for example, while on the other hand, if a passing lane or the like is present on country roads, the danger of adjacent-lane disturbances can be prevented by a timely adjustment of the travel route envelope.

Advantageous embodiments and further refinements of the present invention are derived from the dependent claims.

The proposed method, which is based substantially on a relatively detailed lane detection solely in light of the locating data of the locating device, can also be used in driver assistance systems for other purposes, e.g., for detecting lane-change maneuvers of the host vehicle, for detecting bypass possibilities within the framework of a warning or safety system and the like.

In one example embodiment, the method is used for adjusting the travel route envelope asymmetrically, for instance, in the manner that when there is a high probability that the host vehicle is in the extreme right traffic lane, the travel route envelope is enlarged asymmetrically only on the right side, thereby permitting earlier and steadier target locating, even when the course of the roadway is curved, while by retaining a tighter travel-route envelope boundary on the side facing the adjacent lane, the danger of adjacent-lane disturbances is avoided.

To calculate probability values that the vehicle is traveling at the right or the left edge of the roadway, preferably the measured roadway-edge distances (in the direction transverse to the direction of travel) are compared to a predefined road-edge profile that is based on a realistic assumption for the width of one traffic lane. In so doing, the statistical scattering of the measured lateral offsets of the stationary objects can be incorporated into the analysis as quality parameters for the detection of the edge of the roadway.

In an analogous manner, the measured lateral offsets of the moving objects are also compared to a predefined traffic-lane profile in order to obtain probability values for the presence of an adjacent lane. The differentiation between moving objects which are absolutely moving in the same direction as the host vehicle, and those which are moving in the opposite direction is likewise expedient. In this way, it is possible to differentiate parallel lanes belonging to the same directional roadway, from lanes of oncoming traffic for the opposite driving direction. In countries having right-hand traffic, it may be sufficient to check for the presence of lanes of oncoming traffic only for the left side of the roadway. However, in view of greater robustness of the method and in view of its use in countries having left-hand traffic as well, it is expedient to carry the method into effect equally for the right and left side of the roadway.

The statistical analysis of the locating data includes a low-pass filtering by which, on one hand, a sufficient stability of the probability values, and on the other hand, a sufficiently rapid adjustment to an altered situation are achieved. In so doing, it is useful to initially calculate separate probability values for the following situations: "an edge of the roadway is immediately to the right (to the left) next to the host vehicle", "an adjacent lane is immediately to the right (to the left) next to the host vehicle"; in the case of the adjacent lanes, it is also possible to differentiate between parallel lanes and opposite lanes. After suitable filtering, from these individual probability values, preferably the probability values Q_R and Q_L that the host vehicle is in the extreme right or in the extreme left lane are then calculated.

The extent of the widening of the left or right half of the travel route envelope may be a function of the magnitude of the respective probability value, so that, for example, the greater the probability value Q_R, the more the travel route envelope is widened on the right side. In one advantageous example embodiment, however, the extent of the widening is determined by the envelope curve of the respective probability value, that is, the travel route envelope is widened to the degree the probability value increases, but remains "frozen" in the widened state at least temporarily when the probability value decreases again. The return to a travel route envelope which is not widened or is widened to a lesser extent is then carried out for the vehicle side in question in a reset procedure, which is only implemented when a certain probability speaks for the presence of an adjacent lane on the side in question, and in addition, a vehicle is located in this adjacent lane which could cause an adjacent-lane disturbance, thus, which is slower than the host vehicle and is moving in the same direction. In this way, the narrowing of the travel route envelope, which is really unwanted in view of the sensing of the surroundings, only takes place when the occurrence of adjacent-lane disturbances must seriously be expected.

DETAILED DESCRIPTION OF THE INVENTION

Figure 1:
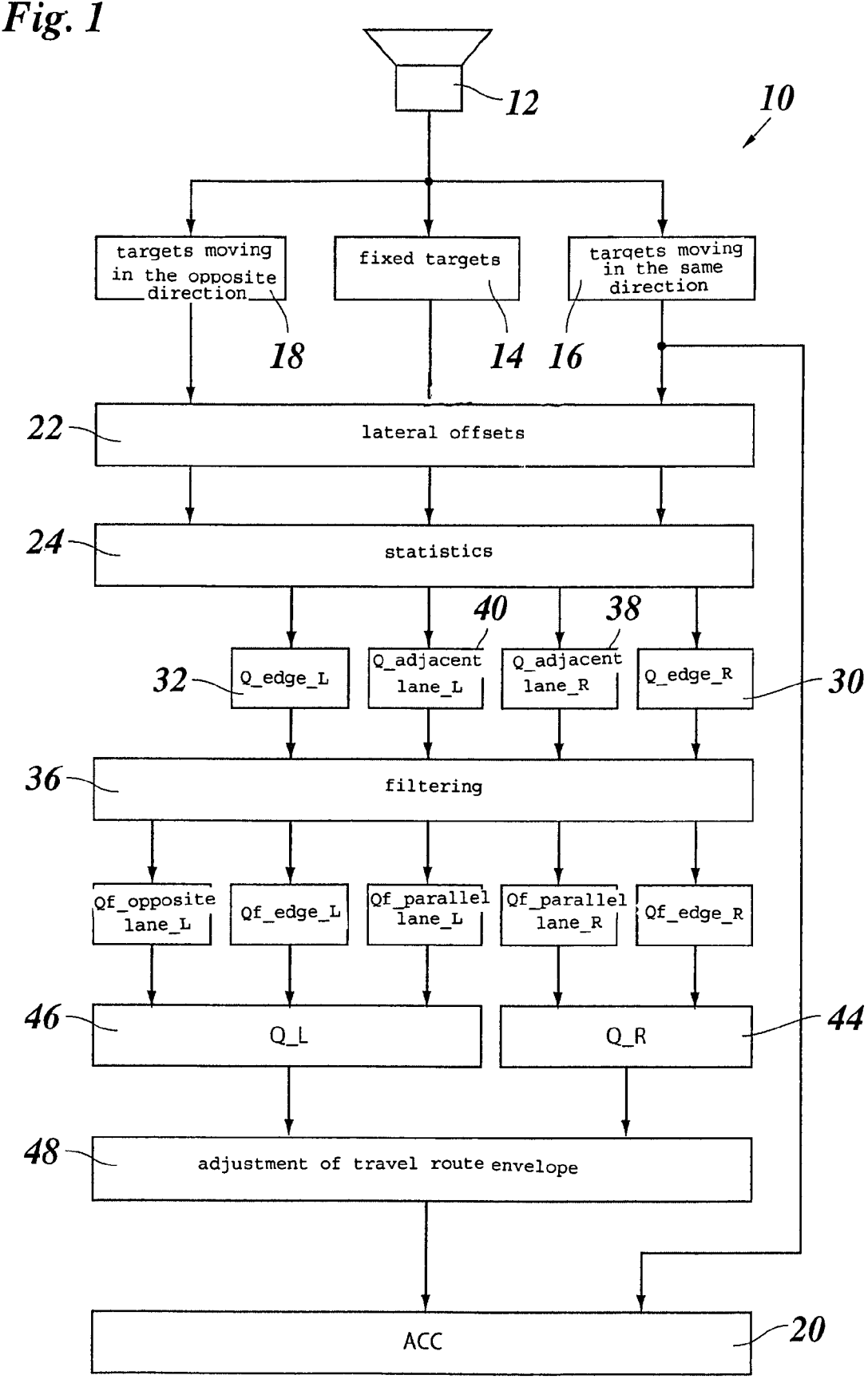
FIG. 1 shows a block diagram of a driver assistance system.

As example for a driver assistance system, FIG. 1 shows an ACC system 10 which evaluates locating data of a radar sensor 12 mounted in the front of the vehicle. The locating data includes the distances, relative speeds and azimuth angles of the located objects. First of all, the absolute speeds of the located objects are calculated by comparing the relative speeds to the traveling speed of the host vehicle, and these objects are divided into three categories: fixed targets 14, targets 16 moving in the same direction, thus objects which are moving in the same direction as the host vehicle, particularly preceding vehicles, and targets 18 moving in the opposite direction, e.g., vehicles in the oncoming traffic. The locating data of targets 16 moving in the same direction is relayed to an ACC controller 20, which carries out the actual distance control.

The functional blocks in FIG. 1 described below are used for determining and adapting, depending on the situation, the travel route envelope, that is, that zone of the roadway which probably will be covered by the host vehicle.

Based on the distances and azimuth angles, in block 22, initially the lateral offsets Y of the located objects are calculated, thus the distances of the located objects from the middle of the host vehicle in the direction transverse to the direction of travel. More precisely, the lateral offsets are the distances from the center line of the travel route envelope to be determined. In block 24, these lateral offsets are then evaluated separately for each of the three object categories. This is illustrated in FIG. 2 for fixed targets 14.

Figure 2:
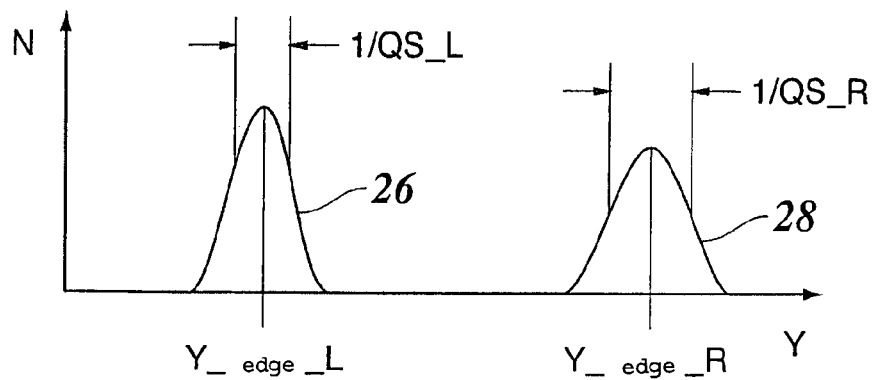
FIG. 2 shows a frequency distribution of stationary objects in the transverse direction of the roadway.

In FIG. 2, the occurrence frequencies N of the objects are plotted against lateral offset Y. The frequency distribution forms two peaks 26, 28, corresponding to the accumulated occurrence of fixed targets such as guardrail posts, noise-protection walls and the like at the left and right edge of the roadway. When calculating lateral offsets Y, a possibly existing curvature of the roadway must be taken into account. This may be estimated in known manner from the measured yaw rate and the traveling speed of the host vehicle. According to a further development, the locating data of fixed targets 14 itself may be utilized for determining the curvature of the roadway. In this case, the uncorrected lateral offsets of the objects for each of the peaks 26, 28 are plotted against the distance, and the distance dependency is approximated by a parabola or a polynomial of a higher degree, which then indicates the curvature of the roadway.

Lateral offsets Y shown in FIG. 2 are already corrected by this roadway curvature. The crest values or centroids of the two peaks 26, 28 represent estimates for the respective roadway-edge distance Y_edge_R or Y_edge_L. The half-value widths or standard deviations of individual peaks 26, 28, more precisely, their reciprocal values, at the same time form a measure QS_R or QS_L for the quality or reliability of the edge detection. These quality parameters are normalized so that they have the value 1 at a very sharply defined peak.

In blocks 30 and 32 in FIG. 1, from this statistical data for the two edges of the roadway, two probability values Q_edge_R and Q_edge_L are calculated, which indicate the probability that the right or left edge of the roadway is directly to the right or directly to the left next to the host vehicle. To that end, edge distances Y_edge_R and Y_edge_L are compared to a predefined road-edge profile as shown for the right edge of the road in FIG. 3.

Figure 3:
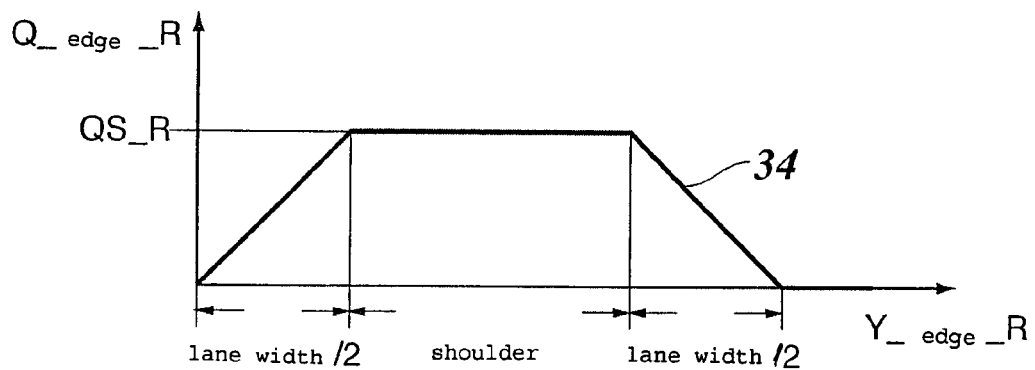
FIG. 3 shows a diagram of a roadway-edge profile.

Curve 34 in FIG. 3 represents a road-edge profile, which is based on the assumption of a realistic value for the "lane width" of a traffic lane, as well as the assumption that the fixed targets, which mark the right edge of the roadway, are within a specific "shoulder" distance area next to the edge of the traffic lane. When edge distance Y_edge_R lies within the "shoulder" distance area, probability value Q_edge_R is assigned the value QS_R (a value between 0 and 1), which represents the quality of the statistical data derived from the half-value width of the peak. Additionally, the number of fixed targets which have contributed to the peak in question may also be incorporated in this quality parameter, since the more objects mark the edge of a road, the more reliable the detection of this edge becomes.

If edge distance Y_R were to equal 0, this would mean that the center of the host vehicle is directly over the right edge of the road, an obviously implausible assumption. Therefore, in this case, probability value Q_edge_R is set to 0 (left end of curve 34 in FIG. 3). In an area which is situated between the distance value 0 and the beginning of the shoulder, and whose width corresponds to half a typical traffic lane, a linear interpolation is carried out. Accordingly, in the case of larger distances, adjacent to the "shoulder" area is an area of half a lane width in which probability value Q_edge R decreases again in linear fashion to 0. In the case of even greater edge distances, Q_edge_R is equal to 0, since in this case, it must more likely be assumed that still a further traffic lane is located between the host vehicle and the right edge of the roadway.

The statistical analysis illustrated in FIG. 2 is updated continually according to the dynamic appearance of new objects, and the determination of Q_edge_R according to FIG. 3 is repeated periodically, in each instance based on the instantaneous data.

The determination of probability value Q_edge_L in block 32 in FIG. 1 is carried out in analogous fashion.

In block 36 in FIG. 1, values Q_edge_R and Q_edge_L, calculated one after another, undergo an asymmetrical low-pass filtering, asymmetrical in the sense that the incrementation is carried out with a smaller time constant in the case of increasing probability values than the decrementation in the case of decreasing probability values. In this context, the time constants are selected in such a way that the time span in which a road edge recognized once is "forgotten", corresponds approximately to the duration of one lane-change occurrence, thus, e.g., approximately 3 s. This filter procedure results in filtered probability values Qf_edge_R and Qf_edge_L that the right edge of the road is directly to the right next to the host vehicle, or the left edge of the road is directly to the left next to the host vehicle.

In similar manner, in blocks 22 and 24, the "historical" lateral offsets of located vehicles are utilized to calculate adjacent-lane probabilities Q_adjacent lane_R and Q_adjacent lane_L, which, indicate the probability that another adjacent lane is located to the right or to the left next to the host vehicle. In this context, initially, no distinction is yet necessary between targets 16 moving in the same direction and targets 18 moving in the opposite direction, that is, the probability of an adjacent lane may also relate to a lane of the oncoming traffic which is not separated by a roadway edge, by guardrails or the like from the lane traveled by the host vehicle, as is often the case, for instance, on country roads and at freeway construction sites.

Since the moving targets will appear only relatively seldom in low traffic density, a statistical analysis in the actual sense is possible only to a limited degree. Therefore, it is expedient to utilize each individual located object separately for calculating a probability of an adjacent lane, by comparing lateral offset Y of the object, measured only once or recorded over a specific period of time and then averaged—again after correction for the curvature of the roadway—to a predefined traffic-lane profile (blocks 38 and 40 in FIG. 1).

Figure 4:
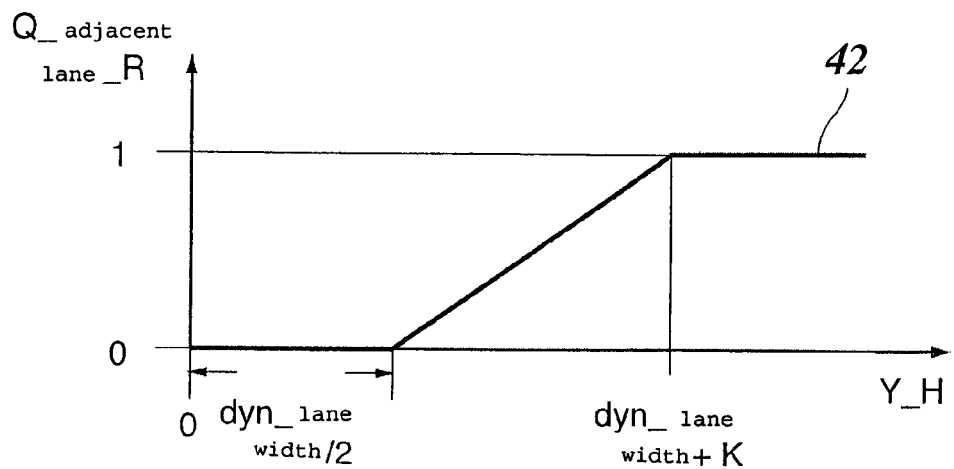
FIG. 4 shows a diagram of a traffic lane profile.

This process is illustrated in FIG. 4 for adjacent-lane probability Q_adjacent lane_R.

Curve 42 in FIG. 4 represents a predefined traffic-lane profile and indicates adjacent-lane probability Q_adjacent lane_R as a function of historical lateral offset Y_H of a single object. If the lateral offset is less than half a predefined dynamic lane width, then the probability value is 0, since it must then be assumed that the object is in the lane being traveled by the host vehicle. The dynamic lane width used in FIG. 4 may be different from the lane width used in FIG. 3 for the edge detection, in order to take into account the circumstance that often there is also a breakdown lane or the like at the edge of the roadway.

If lateral offset Y_H is greater than a full dynamic lane width, increased by a correction value K, then the adjacent-lane probability is equal to 1, since it is then safe to assume that the vehicle is in an adjacent lane. A linear interpolation is carried out between the values dyn_lane width/2 and dyn_lane width+K.

Correction value K takes into account the circumstance that the measured value for the lateral offset becomes more unreliable with greater object distances, and is therefore a function of the specific object distance. The limited accuracy in determining the curvature of the roadway contributes substantially to this uncertainty. This accuracy can be described by a yaw-rate error k, and since the lateral offset is proportional to the roadway curvature and to the square of distance D, one expediently selects: $K=(½)*k*D^2$.

Adjacent-lane probability Q_adjacent lane_L is determined analogously in block 40.

It would also be conceivable to subject the lateral offsets for moving objects to a more precise statistical analysis (in a larger time frame) in order to obtain more accurate values for the positions and widths of the individual traffic lanes. This information could be used for a dynamic adjustment of the variables "lane width" and "dyn_lane width" in FIGS. 3 and 4.

In block 36 in FIG. 1, the adjacent-lane probabilities calculated in blocks 38 and 40 are filtered with a suitable time constant tau in the following manner:

$$Q_{i+1}=Q_i+(dt/tau)*(Q\_\text{adjacent lane}-Q_i)$$

In this context, $Q_{i+1}$ is the new filtered value, $Q_i$ is the previous filtered value, dt is the duration of one scanning cycle and Q_adjacent lane is either Q_adjacent lane_R or Q_adjacent lane_L, depending upon whether it is an object to the right or to the left next to the host vehicle. The time constant tau amounts to 3.0 s, for example.

In the example shown, this filter procedure is carried out in parallel for three different object categories. In so doing, it is not only differentiated whether the object currently considered is to the right or to the left, but for objects on the left side, it is also differentiated whether it is a target 16 moving in the same direction or a target 18 moving in the opposite direction. If several objects of the same category are located in the instantaneous scanning cycle, then the filter cycle is run through repeatedly, and filtered values $Q_{i+1}$ are updated more frequently accordingly. In this way, the event frequency is also incorporated into the corresponding probability values.

The results $Q_{i+1}$ are filtered probability values Qf_parallel lane_R, Qf_parallel lane_L and Qf_opposite lane_L. Lanes with oncoming traffic to the right of the host vehicle are not generally to be expected in countries with right-hand traffic, but it is expedient to also include this possibility and to use a corresponding filter procedure to calculate a filtered probability value Qf_opposite lane_R as well, which, however, is not shown in FIG. 1 for the sake of simplicity.

If no moving objects are located for one side of the roadway and one direction of travel within one scanning cycle, the corresponding adjacent-lane probability Qf_adjacent lane_R or Qf_adjacent lane_L is equal to 0, and the filter procedure leads to a decay of the filtered probability value with a time constant of 3 s.

In blocks 44 and 46 in FIG. 1, the filtered probability values for the various classes of moving objects and for the roadway edges are logically combined with each other, so that ultimately a probability value Q_R is obtained that the host vehicle is in the extreme right traffic lane, as well as a probability value Q_L that the vehicle is in the extreme left traffic lane. In the example shown, the logic operation for Q_R is carried out according to the formula:

$$Q\_R=\text{MAX}(Qf\_\text{edge}\_R-Qf\_\text{parallel lane}\_R, 0)$$

This probability value is high if the right roadway edge on the right side is close to the host vehicle, and is low if at least one parallel lane is to the right next to the vehicle.

For Q_L, the logic operation is carried out according to the formula:

$$Q\_L=\text{MAX}(Qf\_\text{edge}\_L+Qf\_\text{opposite lane}\_L-Qf\_\text{parallel lane}\_L, 0)$$

In this case, the probability also increases when vehicles are located in an opposite lane, which indicates that the host vehicle is at the extreme left edge of its own directional roadway.

Optionally, if targets moving in an opposite direction are also evaluated on the right side of the vehicle, Q_R may also be formed in a manner completely analogous to Q_L.

Another conceivable refinement is that, when calculating the adjacent-lane probabilities in blocks 38 and 40, the profile shown in FIG. 4 is used only for targets moving in the same direction, while for targets moving in an opposite direction, a different profile is used for which the probability declines again to 0 in the case of larger lateral offsets. This would take into account the circumstance that when the locating angular range of the radar sensor is very wide, the oncoming traffic can be located even when the host vehicle is closer to the right edge of the roadway.

In block 48 in FIG. 1, the travel route envelope is then adjusted asymmetrically on the basis of probability values Q_R and Q_L. It is assumed that the characteristic of the center line of the travel route envelope has already been ascertained in known manner, for example, based on the roadway curvature, which was ascertained in the manner described above. The adjustment of the travel route envelope then concerns only the adjustment of the width of the travel route envelope, and specifically asymmetrically in the sense that the width is adjusted for the right and the left half of the travel route envelope independently of each other. In so doing, in general, it holds true that the travel route envelope is widened to the right when the vehicle is in the extreme right traffic lane, and to the left when it is in the extreme left traffic lane.

Figure 5:
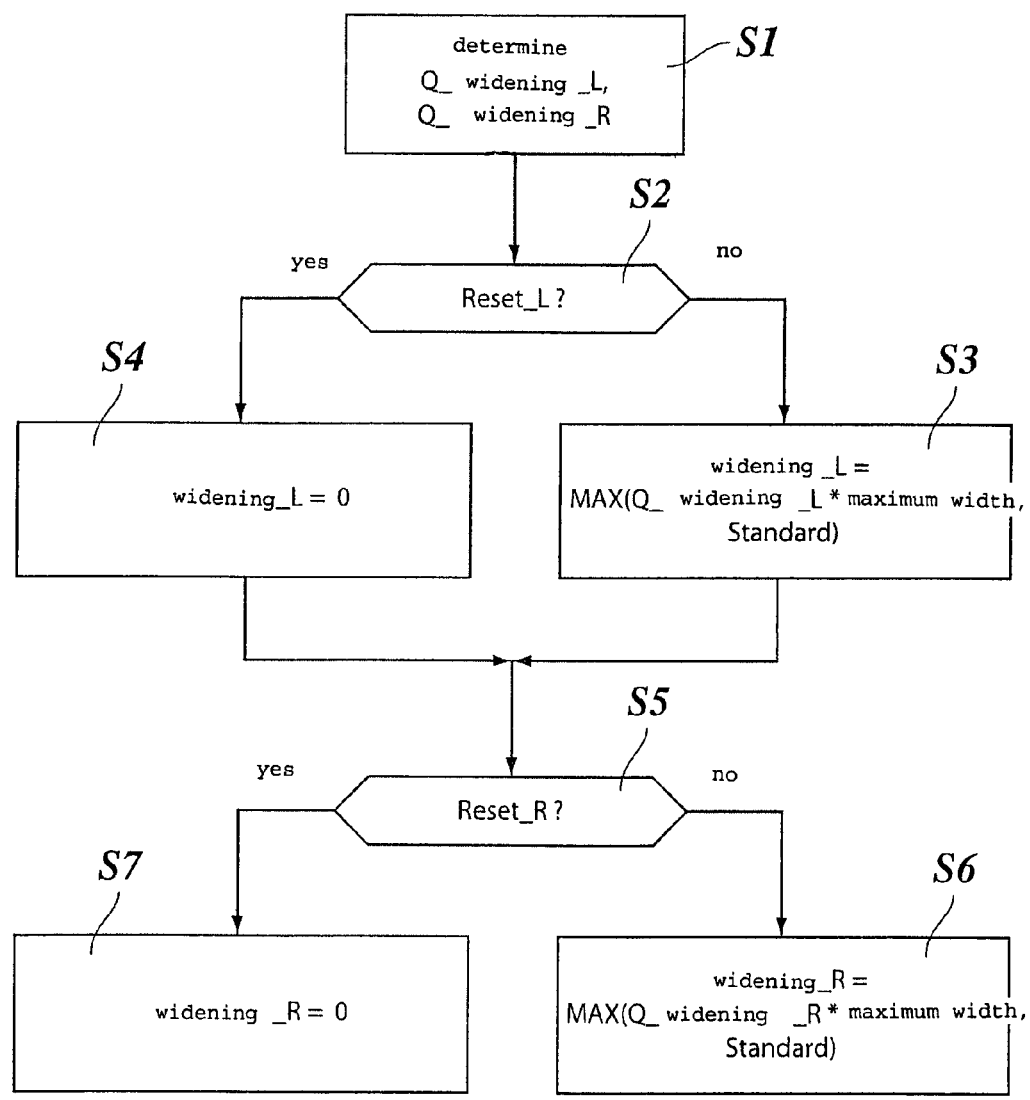
FIG. 5 shows a flowchart of a procedure for determining a widening of the travel route envelope.
Figure 6:
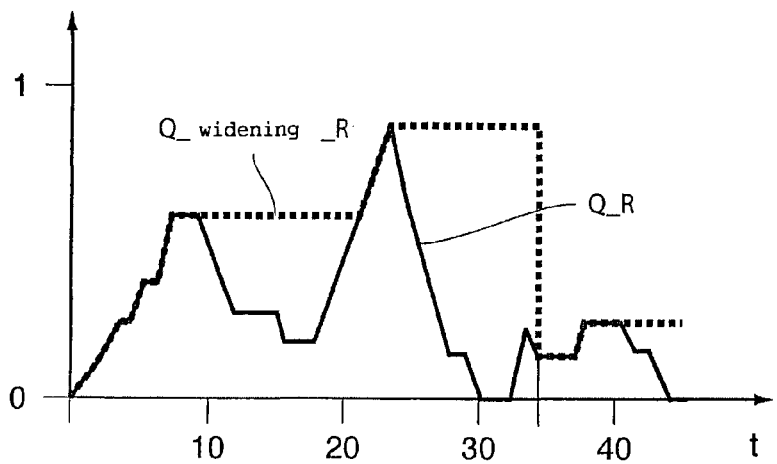
FIG. 6 shows a timing diagram for clarifying the procedure shown in FIG. 5.

The procedure of adjusting or widening the travel route envelope shall now be clarified with reference to FIGS. 5 and 6.

In step S1 in FIG. 5, initially two widening parameters Q_widening_L and Q_widening_R are calculated. The dependency of these widening parameters on Q_R and Q_L is shown by the example of the right vehicle side in FIG. 6. There, the temporal development of probability value Q_R over a period of time of approximately 40 s is plotted against time t. Widening parameter Q_widening_R is given by the envelope curve with respect to the graph of Q_R. Therefore, the widening parameter is equal to Q_R so long as Q_R increases, and the widening parameter remains constant when Q_R decreases. This ensures that the widening of the travel route envelope is retained even when the associated probability value Q_R has decayed for lack of evaluable information.

Only under certain conditions, namely when traffic in the same direction of travel has been detected with a suitable adjacent-lane probability, is adjacent-lane probability Q_adjacent lane_R compared to a specific threshold value. If this threshold value is exceeded, then the vehicle is assigned with high probability to the adjacent lane, and for a specific minimum time, a reset flag is set, which returns the widening parameter again to Q_R. Such a reset event takes place in FIG. 6 at time t=34 s. If no new reset event occurs within the minimum time mentioned, the reset flag is reset again, and the widening parameter is determined again by the envelope curve of Q_R.

The reset events are also defined independently of each other for the two halves of the travel route envelope. A reset for the right half of the travel route envelope takes place only in the event of traffic in the same direction in the right adjacent lane, and correspondingly, a reset for the left half of the travel route envelope takes place only in the event of traffic in the same direction in the left adjacent lane.

In FIG. 5, it is checked in step S2 whether reset flag reset_L is set for the left side. If this is not the case, in step S3, a widening of the travel route envelope "widening_L" is calculated for the left half of the travel route envelope. This is equal to the product of the widening parameter Q_widening_L and a predefined maximum width of, e.g., 1.4 m. Thus, the more certain it is that the vehicle is in the extreme left lane, the further the travel route envelope is expanded to the left. However, the widening of the travel route envelope corresponds at least to a predefined standard value of, for example, 0.4 m. The width of the left half of the travel route envelope is then defined by half of a basic width of, for instance, 2.2 m+widening_L.

If the reset flag is set in step S2, then in step S4, the widening of the travel route envelope widening_L is set to 0, that is, the left half of the travel route envelope is reduced to half the basic width.

Following step S3 or S4, in step S5 it is then checked whether reset flag reset_R is set for the right side. If this is not the case, in step S6, the widening of the travel route envelope "widening_R" is calculated for the right half of the travel route envelope in a manner analogous to step S3, and otherwise, in step S7, the right half of the travel route envelope is reduced to half the basic width.

The practical effect of this adjustment of the travel route envelope is now explained based on several examples with reference to FIGS. 7 through 10.

Figure 7:
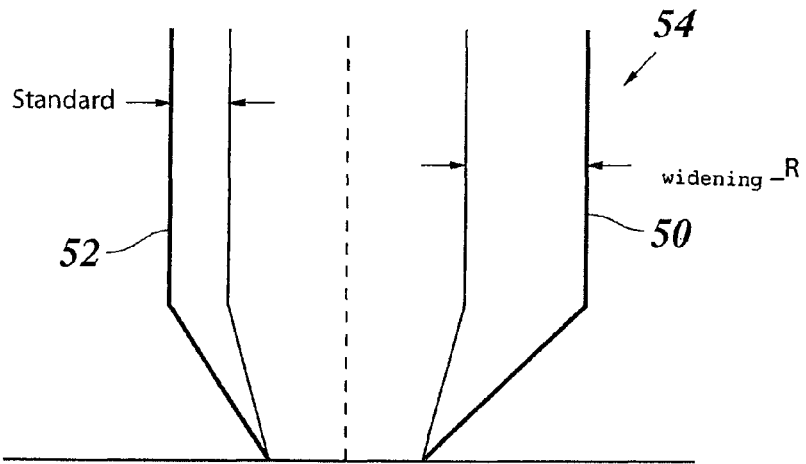
FIGS. 7 to 10 show examples for different widenings of the travel route envelope in various situations.

In FIG. 7, the outer limits of a right half 50 and a left half 52 of a travel route envelope 54 are marked in bold, and a region which corresponds to the basic width of the travel route envelope is marked in thin lines. A dashed line separates the left and the right half of the travel route envelope. The geometry of the travel route envelope shown in FIG. 7 corresponds, for instance, to a situation in which the traffic-lane detection has supplied a very high value for Q_R, while no information is available for the left adjacent lane. This situation is typical for driving in the extreme right lane on a freeway when there are no vehicles moving more slowly in the left adjacent lane, as well as for driving on a country road without oncoming traffic. Corresponding to the high value of Q_R, and therefore also a high value of the widening parameter Q_widening_R, right half 50 of the travel route envelope is widened to the maximum, e.g., by 1.4 m, while only the standard widening of 0.4 m holds true for left half 52 of the travel route envelope. Because of the widening of the right half of the travel route envelope, objects in the lane traveled by the host vehicle, thus the extreme right lane, can be detected reliably and early on, so that the approach behavior of the host vehicle may be suitably regulated. The standard widening of the left half of the travel route envelope, in view of the lack of information about this side of the vehicle, represents a compromise between detection certainty and the avoidance of adjacent-lane disturbances perhaps yet possible.

Figure 8:
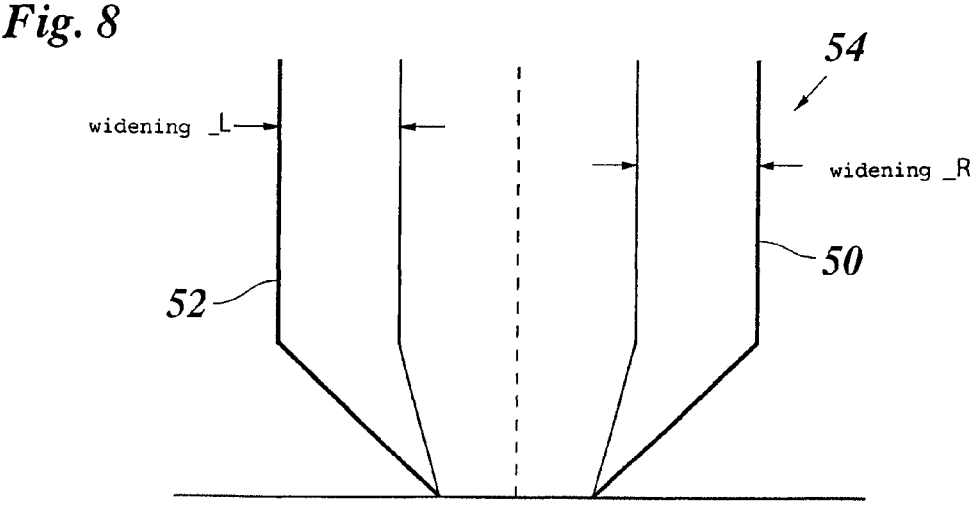

In FIG. 8, both halves of the lane are widened to the maximum. This configuration is optimal for driving on single-lane roadways, e.g., in the case of single-lane traffic routing on an expressway, or when driving on country roads with oncoming traffic. The maximum widenings result from the fact that both Q_R and Q_L have high values, since the single traffic lane is the extreme right and at the same time the extreme left traffic lane.

Figure 9:
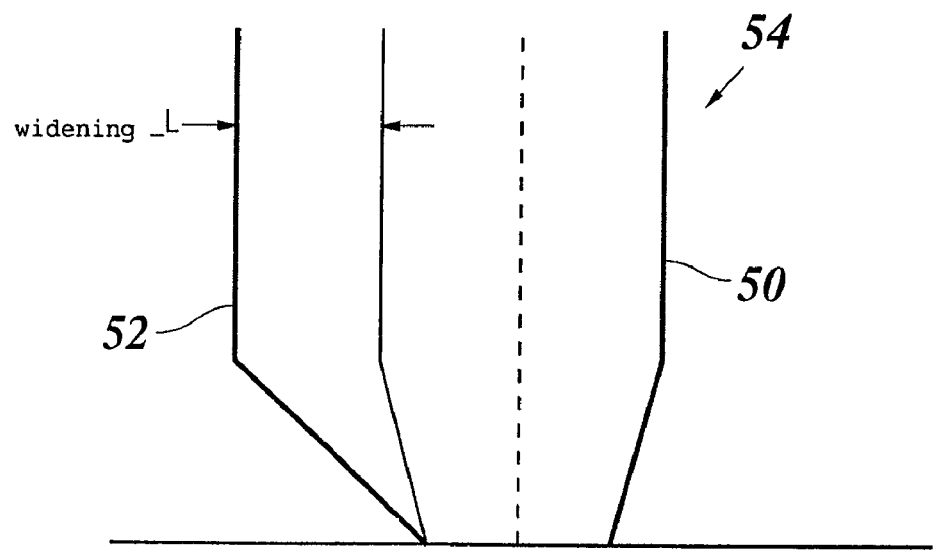

In FIG. 9, left half 52 of the travel route envelope is widened to the maximum, while right half 50 of the travel route envelope is reduced to the basic width. This situation is typical for a passing maneuver on country roads or in the extreme left lane of an expressway. The reduction in the right half of the travel route envelope was brought about by step S7 in FIG. 5, following a reset in step S5, triggered by the detection of slow (overtaken) vehicles in a right adjacent lane. When the flag falls again after the reset time has elapsed, the widening of the right half of the travel route envelope is increased again to the standard value (0.4 m) until a new reset is triggered. If, for instance, after a lane change upon completing a passing maneuver, there are increasing signs that the traffic lane being used by the host vehicle is the extreme right traffic lane, the widening of the right half of the travel route envelope increases beyond the standard value.

Figure 10:
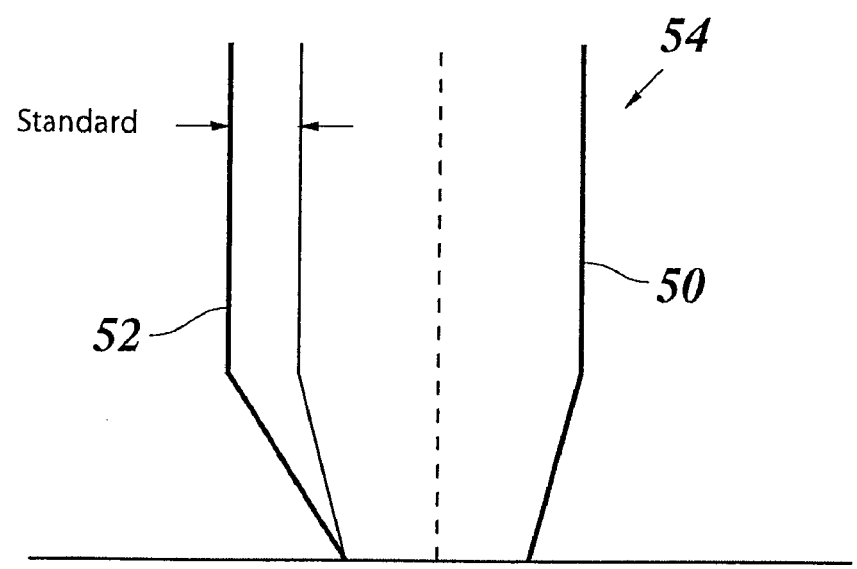

The situation shown in FIG. 10 differs from the situation according to FIG. 9 in that left half 52 of the travel route envelope is widened only to the standard value. This situation is typical for driving in the middle lane of an expressway, while slower vehicles in the right adjacent lane are passed, and at the same time, the host vehicle is passed by faster vehicles in the left adjacent lane. The slower vehicles in the right adjacent lane constantly trigger a reset again. On the other hand, the vehicles in the left lane do not trigger a reset, since they are faster than the host vehicle. However, the vehicles in the left adjacent lane no doubt prevent an increase of probability value Q_L, and with that an increase of widening_L (step S3 in FIG. 5) over the standard value. When the host vehicle has changed from the extreme left lane (configuration according to FIG. 9) to the middle lane, the configuration according to FIG. 9 with maximally widened left half of the travel route envelope is retained until the reset flag-reset_L is set once by a slower vehicle in the left adjacent lane. Analogous to FIG. 6, widening parameter Q_widening_L is thereby reset to Q_L, and the configuration according to FIG. 10 then results.

What is claimed is

1. A method for determining a plausibility of an object detected by a driver assistance system of a motor vehicle, wherein the driver assistance system includes a locating system, the method comprising:
locating, by the locating system, objects in the surroundings of the vehicle, the objects including stationary objects and moving objects;
measuring, by the locating system, lateral offsets of the located objects in a direction perpendicular to a direction of travel of the motor vehicle;
defining a travel route envelope for the motor vehicle; and
determining a plausibility of the moving objects based on whether the moving objects are one of inside and outside of the travel route envelope, wherein the plausibility determination includes:
statistical analysis of the lateral offsets of the stationary objects to detect left and right roadway boundaries;
analysis of the lateral offsets of the moving objects to detect any adjacent lanes;

calculating a first probability value that the vehicle is in an extreme right traffic lane of the roadway, and a second probability value that the vehicle is in an extreme left traffic lane; and varying at least one of a width and a lateral position of the travel route envelope as a function of the first and second probability values.

2. The method as recited in claim 1, wherein a width of a right half of the travel route envelope is varied as a function of the first probability value, and wherein a width of a left half of the travel route envelope is varied as a function of the second probability value.

3. The method as recited in claim 2, further comprising:
forming a third probability value and a fourth probability value by statistical analysis of the lateral offsets of the stationary objects, wherein the third and fourth probability values indicate a probability that the motor vehicle is close to one of the right boundary and the left boundary of the roadway, and wherein the third probability value is incorporated into the first probability value and the fourth probability value is incorporated into the second probability value in a manner that increases probability.

4. The method as recited in claim 3, wherein a first statistical quality parameter characterizing a quality of detection of the left roadway boundary is incorporated into the third probability value and a second statistical quality parameter characterizing a quality of detection of the right roadway boundary is incorporated into the fourth probability value in a manner that increases probability.

5. The method as recited in claim 3, wherein the third probability value is determined on the basis of a predefined roadway-edge profile as a function of a lateral offset value for the right roadway boundary, and wherein the fourth probability value is determined on the basis of the predefined roadway-edge profile as a function of a lateral offset value for the left roadway boundary.

6. The method as recited in claims 3, wherein the third and fourth probability values are subjected to a low-pass filtering before being incorporated into the first and second probability values.

7. The method as recited in claim 1, further comprising:
determining a first adjacent-lane probability indicating a probability that an adjacent lane is to the right next to the vehicle and a second adjacent-lane probability indicating a probability that an adjacent lane is to the left next to the vehicle, wherein the first and second adjacent-lane probabilities are determined on the basis of a predefined traffic-lane profile as a function of the lateral offsets of the moving objects.

8. The method as recited in claim 7, wherein a first filtered probability value is formed by subjecting the first adjacent-lane probability for each located object moving in same direction as the motor vehicle to a low-pass filter cycle, wherein a second filtered probability value is formed by subjecting the second adjacent-lane probability for each located object moving in the same direction as the motor vehicle to a low-pass filter cycle, and wherein the first and second filtered probability values are incorporated into the corresponding first and second probability values, respectively, in a manner that lowers probability.

9. The method as recited in claim 8, wherein at least one further filtered probability value is formed by subjecting the second adjacent-lane probability for each located object moving in an opposite direction with respect to the motor vehicle to a low-pass filter cycle, and wherein the at least one further filtered probability value is incorporated into the second probability value in a manner that increases probability.

10. The method as recited in claim 7, further comprising:
forming at least one widening parameter, wherein the at least one widening parameter increases if at least one of the first and second probability values increases, wherein the at least one widening parameter remains constant if the first and second probability values decrease, and wherein the at least one widening parameter is reset to one of the first probability value and the second probability value when: a) an object is located on, respectively, a right side of the vehicle or the left side of the vehicle; b) the object has one of the first and second adjacent-lane probabilities above a predetermined threshold value; and c) the object is moving at a different speed than the motor vehicle in the same direction as the motor vehicle.

11. The method as recited in claim 10, wherein the width of the travel route envelope is between a predetermined standard value and a predetermined maximum value as long as no reset exists, and wherein, in response to a reset, the width of the travel route envelope is reduced for a specified time to a predetermined basic width which is less than the predetermined standard width.

12. A driver assistance system of a motor vehicle configured to determine a plausibility of a detected object, comprising:
a sensor configured to detect objects in the surroundings of the vehicle, the detected objects including stationary objects and moving objects; and
a processing arrangement configured to perform the following based on data from the sensor regarding the detected objects:
determine lateral offsets of the objects in a direction perpendicular to a direction of travel of the motor vehicle;
define a travel route envelope for the motor vehicle; and
determine a plausibility of the moving objects based on whether the moving objects are one of inside and outside of the travel route envelope;
wherein the plausibility determination includes:
statistical analysis of the lateral offsets of the stationary objects to detect left and right roadway boundaries;
analysis of the lateral offsets of the moving objects to detect any adjacent lanes;
calculating a first probability value that the vehicle is in an extreme right traffic lane of the roadway, and a second probability value that the vehicle is in an extreme left traffic lane; and
varying at least one of a width and a lateral position of the travel route envelope as a function of the first and second probability values.

13. The driver assistance system as recited in claim 12, wherein a width of a right half of the travel route envelope is varied as a function of the first probability value, and wherein a width of a left half of the travel route envelope is varied as a function of the second probability value.

14. The driver assistance system as recited in claim 13, wherein:
the processing arrangement is configured to form a third probability value and a fourth probability value by statistical analysis of the lateral offsets of the stationary objects;
the third and fourth probability values indicate a probability that the motor vehicle is close to one of the right boundary and the left boundary of the roadway; and
the third probability value is incorporated into the first probability value and the fourth probability value is incorporated into the second probability value in a manner that increases probability.

15. The driver assistance system as recited in claim 14, wherein a first statistical quality parameter characterizing a quality of detection of the left roadway boundary is incorporated into the third probability value and a second statistical quality parameter characterizing a quality of detection of the right roadway boundary is incorporated into the fourth probability value in a manner that increases probability.

16. The driver assistance system as recited in claim 14, wherein the third probability value is determined on the basis of a predefined roadway-edge profile as a function of a lateral offset value for the right roadway boundary, and wherein the fourth probability value is determined on the basis of the predefined roadway-edge profile as a function of a lateral offset value for the left roadway boundary.

17. The driver assistance system as recited in claims 14, wherein the third and fourth probability values are subjected to a low-pass filtering before being incorporated into the first and second probability values.

18. The driver assistance system as recited in claim 12, wherein:
the processing arrangement is configured to determine a first adjacent-lane probability indicating a probability that an adjacent lane is to the right next to the vehicle and a second adjacent-lane probability indicating a probability that an adjacent lane is to the left next to the vehicle; and
the first and second adjacent-lane probabilities are determined on the basis of a predefined traffic-lane profile as a function of the lateral offsets of the moving objects.

19. The driver assistance system as recited in claim 18, wherein a first filtered probability value is formed by subjecting the first adjacent-lane probability for each detected object moving in same direction as the motor vehicle to a low-pass filter cycle, wherein a second filtered probability value is formed by subjecting the second adjacent-lane probability for each detected object moving in the same direction as the motor vehicle to a low-pass filter cycle, and wherein the first and second filtered probability values are incorporated into the corresponding first and second probability values, respectively, in a manner that lowers probability.

20. The driver assistance system as recited in claim 19, wherein at least one further filtered probability value is formed by subjecting the second adjacent-lane probability for each detected object moving in an opposite direction with respect to the motor vehicle to a low-pass filter cycle, and wherein the at least one further filtered probability value is incorporated into the second probability value in a manner that increases probability.

21. The driver assistance system as recited in claim 18, wherein:
the processing arrangement is configured to form at least one widening parameter;
the at least one widening parameter increases if at least one of the first and second probability values increases;
the at least one widening parameter remains constant if the first and second probability values decrease; and
the at least one widening parameter is reset to one of the first probability value and the second probability value when: a) an object is detected on, respectively, a right side of the vehicle or the left side of the vehicle; b) the object has one of the first and second adjacent-lane probabilities above a predetermined threshold value; and c) the object is moving at a different speed than the motor vehicle in the same direction as the motor vehicle.

22. The driver assistance system as recited in claim 21, wherein the width of the travel route envelope is between a predetermined standard value and a predetermined maximum value as long as no reset exists, and wherein, in response to a reset, the width of the travel route envelope is reduced for a specified time to a predetermined basic width which is less than the predetermined standard width.

* * * * *